(12) United States Patent
Buckley (10) Patent No.: US 10,539,718 B2
(45) Date of Patent: Jan. 21, 2020

(54) FRESNEL LENS ARRAY WITH IMPROVED OFF-AXIS OPTICAL EFFICIENCY

(71) Applicant: Honeywell International Inc., Morris Plains, NJ (US)

(72) Inventor: Mark C. Buckley, Camino, CA (US)

(73) Assignee: Honeywell International Inc., Morris Plains, NJ (US)

( * ) Notice: Subject to any disclaimer, the term of this patent is extended or adjusted under 35 U.S.C. 154(b) by 70 days.

(21) Appl. No.: 15/679,571

(22) Filed: Aug. 17, 2017

(65) Prior Publication Data

US 2019/0056536 A1    Feb. 21, 2019

(51) Int. Cl.
     *G02B 3/00*      (2006.01)
     *G02B 3/08*      (2006.01)

(52) U.S. Cl.
     CPC ......... *G02B 3/0062* (2013.01); *G02B 3/0037* (2013.01); *G02B 3/0043* (2013.01); *G02B 3/0056* (2013.01); *G02B 3/0075* (2013.01); *G02B 3/08* (2013.01)

(58) Field of Classification Search
     CPC ...... G02B 3/08; G02B 3/0043; G02B 3/0006; G02B 3/0037; G02B 3/005; G02B 3/0056; G02B 3/0062; G02B 3/0068; G02B 3/0075; G03B 21/10; G03B 21/625
     USPC ................................................. 359/457, 742
     See application file for complete search history.

(56) References Cited

U.S. PATENT DOCUMENTS

| | | | |
|---|---|---|---|
| 4,375,034 A | 2/1983 | Guscott | |
| 4,604,524 A | 8/1986 | Kotlicki et al. | |
| 4,703,171 A | 10/1987 | Kahl et al. | |
| 4,707,604 A | 11/1987 | Guscott | |
| 4,757,204 A | 7/1988 | Baldwin et al. | |
| 4,978,843 A | 12/1990 | Yamakawa | |
| 4,990,783 A | 2/1991 | Muller et al. | |
| 5,017,783 A | 5/1991 | Mousavi | |
| 5,026,990 A | 6/1991 | Marman et al. | |
| D331,124 S * | 11/1992 | Claytor | D10/121 |
| D331,126 S * | 11/1992 | Claytor | D26/122 |
| D340,311 S * | 10/1993 | Claytor | D10/121 |
| 5,311,024 A | 5/1994 | Marman et al. | |
| 5,442,178 A * | 8/1995 | Baldwin | G02B 3/08 250/342 |

(Continued)

FOREIGN PATENT DOCUMENTS

| | | |
|---|---|---|
| CN | 103618849 A | 3/2014 |
| WO | 2010125615 A1 | 11/2010 |

OTHER PUBLICATIONS

Murata Manufacturing Co., Ltd., "Pyroelectric Infrared Sensors," muRata Innovator in Electronics, 25 pages, Oct. 1, 2012. S21J.pdf, http://www.murata.com/.

(Continued)

*Primary Examiner* — Jordan M Schwartz
(74) *Attorney, Agent, or Firm* — Seager Tufte & Wickhem LLP (57) ABSTRACT

Fresnel lens arrays, devices, systems and methods of forming them are described herein. One array includes a Fresnel lens array, having a first portion including one or more defined areas of one or more Fresnel lenses, and a second portion including a first section that has its optical center located in a second section that is vertically above or below the first section and wherein each section is formed from a defined area of the one or more Fresnel lenses.

18 Claims, 9 Drawing Sheets

(56) References Cited

U.S. PATENT DOCUMENTS

| | | | |
|---|---|---|---|
| 5,577,779 A | 11/1996 | Dangel | |
| 5,864,381 A * | 1/1999 | Neal | G01J 9/00 351/200 |
| 6,121,876 A | 9/2000 | McKenney | |
| 6,137,535 A * | 10/2000 | Meyers | G02B 3/0043 348/340 |
| 6,948,692 B2 | 9/2005 | Leachman | |
| 7,488,941 B2 * | 2/2009 | Lee | F21V 23/0442 250/342 |
| 8,629,930 B2 | 1/2014 | Brueckner et al. | |
| 9,223,063 B2 | 12/2015 | Hu et al. | |
| 9,500,517 B2 | 11/2016 | Gupta et al. | |
| 2008/0272281 A1 * | 11/2008 | Stromberg et al. | G08B 13/189 250/216 |
| 2012/0176668 A1 | 7/2012 | Saito et al. | |
| 2012/0192919 A1 * | 8/2012 | Mizuyama | G02B 3/0056 136/246 |
| 2012/0227796 A1 * | 9/2012 | Dougherty | G02B 3/08 136/255 |
| 2012/0274811 A1 | 11/2012 | Bakin | |
| 2013/0126739 A1 | 5/2013 | Oi et al. | |
| 2013/0321581 A1 * | 12/2013 | Ei-Ghoroury | H04N 5/225 348/46 |
| 2013/0338839 A1 | 12/2013 | Rogers et al. | |
| 2014/0346362 A1 | 11/2014 | Filson et al. | |
| 2015/0101667 A1 * | 4/2015 | Benitez | G02B 3/08 136/259 |
| 2015/0233595 A1 | 8/2015 | Fadell et al. | |
| 2015/0248796 A1 | 9/2015 | Iyer et al. | |

OTHER PUBLICATIONS

Snap fit, power point document, downloaded May 11, 2017, pp. 1-17.
Explore Plastic Injection, Sheet Metal, and more!, Bildergebnis für snap fit | Mechanical Engineering | Pinterest | Fit, Search and Craft, https://in.pinterest.com/pin/365002744786434665/, Dec. 8, 2017.
Snap fit—Google Search, https://www.google.co.in/search?q=snap+fit&source=lnms&tbm=isch&s, Dec. 8, 2017.
International Search Report and Written Opinion for Application No. PCT/US2018/046955, 16 pages, dated Dec. 17, 2018.

* cited by examiner

FRESNEL LENS ARRAY WITH IMPROVED OFF-AXIS OPTICAL EFFICIENCY

TECHNICAL FIELD

The present disclosure relates to devices, methods, and systems for providing a Fresnel lens array with improved off-axis optical efficiency.

BACKGROUND

Fresnel lenses are typically round when viewed from their front and as such, their form factor may not be usable in some situations. For example, where a small and/or polygonal implementation is needed, such round devices may not fit within the area in which the lens is needed.

Further, in some implementations, a wide field of view may be desired. However, a Fresnel lens has a limited field of view that may be too limited to be usable in such implementations.

In some implementations, an array of Fresnel lenses can be used to create discrete detection zones and increase the field of view. A flat Fresnel lens array will generate low optical efficiency in the outer elements of the array due to off-axis issues. A cylindrical or spherical formation can be used to somewhat mitigate the off-axis efficiency issues.

However, although a cylindrical or spherical lens array would be optically more efficient, a flat lens array may be required for cosmetic reasons or due to the area available within the form factor of the device on which the lens array is to be mounted. In a cylindrical or spherical array, each element in the array can be oriented such that the normal vector to the center of the lens (e.g., optical axis of each lens element) points toward a detection zone that the lens element is intended to detect motion in.

In this on-axis lens orientation, an image focused on a pyroelectric sensor's detector of a target (e.g., from a human) in that lens element's detection zone will form a nicely focused and un-abberated image. Additionally, all lens elements in a cylindrical or spherical lens array can be of a single focal length equal to the radius of curvature of the array. In a traditional flat Fresnel lens array, a lens element in the center of the array directly in front of the pyroelectric sensor will generate an image of a target on the detectors that is in focus and un-abberated when the correct focal length Fresnel lens is used. However, as the target moves off center and lens elements are placed to the side of lens center, the images generated using lens elements of the same focal length become more and more out of focus.

To compensate, longer focal lengths are used as elements depart from center. The off axis effects produce more and more abberated images as elements depart from center even when using the appropriate focal lengths resulting in progressively less energy reaching the pyro detectors as more energy goes above, below, to the left, and to the right of the pyroelectric sensors detectors.

In an attempt to compensate for the out of focus issue, the lens designer can progressively increase the element focal lengths to balance the energy on each detector and increase the element size progressively as the elements depart from the center position. The goal of increasing the element size is to achieve the same amount of energy landing on the pyro detector when the target is in one of the two detection zones of a side lens element as when the target is in one of the two detection zones of the center lens element.

There is a limit to the lens size of these side elements in a flat lens array wherein increasing the size of the element beyond a certain size no longer results in a proportional increase in energy and ultimately results in no increase in energy landing on the detectors of the pyroelectric (pyro) sensors. It is this issue that limits the practical horizontal field of view angle of a flat Fresnel lens array. This can be an issue, for example, where it is desirable to have near the same level of energy landing on the pyro detectors from a target at 9.5 meters distance in detection zones coming from the outside lens elements reaching horizontally as far as 60° off axis, as that landing on the pyro detectors from a target at 12.0 meters distance, in detection zones coming from the center lens element, where the image is on-axis.

DETAILED DESCRIPTION

Fresnel lens arrays, devices, and systems and methods of creating such arrays are described herein. For example, one embodiment includes a Fresnel lens array, having a first portion including one or more defined areas of one or more Fresnel lenses, and a second portion including a first section that has its optical center located in a second section that is vertically above or below the first section and wherein each section is formed from a defined area of the one or more Fresnel lenses.

These defined areas (i.e., lens elements) can be created from parts of one type of Fresnel lens or from multiple lenses to form a unique array structure. The benefits of such structures can be a wider field of view and/or improved form factor among many other benefits.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of lens elements" can refer to one or more lens elements.

Figure 1:
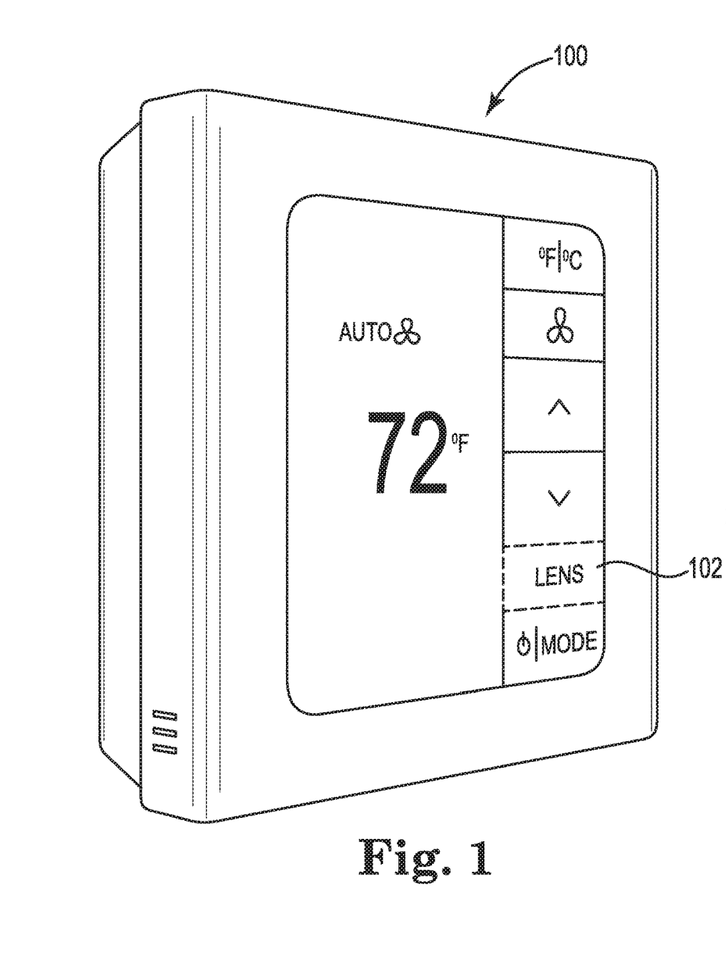
FIG. 1 illustrates a system utilizing a Fresnel lens array constructed in accordance with one or more embodiments of the present disclosure.

FIG. 1 illustrates a system utilizing a Fresnel lens array constructed in accordance with one or more embodiments of the present disclosure. The system of FIG. 1 is a building control unit 100 that controls various functions within the building.

In the system illustrated in FIG. 1, the building control unit 100 includes a flat screen and utilizes a pyro device 102, with a Fresnel lens array according to an embodiment of the present disclosure, to determine if a target (in this implementation, a human) is present in the area around the unit 100. If a human is present, then the unit can, for example, set a building control parameter (e.g., the temperature and/or other control parameters controlled by the unit, for instance including but not limited to heating, cooling, humidity, fan speed, and/or other connected home functionalities that are controlled by such control units of a building, etc.) based on the presence of a human. If a human is not present, then the building control parameter is set based on the human not being present.

Such functionality can be beneficial, for example, when a human is at work during the day, but returns home in the evening or is on vacation and returns home. In such implementations, the building control unit can be used to provide comfortable building characteristics (based on changing one or more building control parameters) when the human is present and can, for example, switch to a set of characteristics (based on changing one or more building control parameters) that promote energy savings when the human is not present.

Figure 2A:
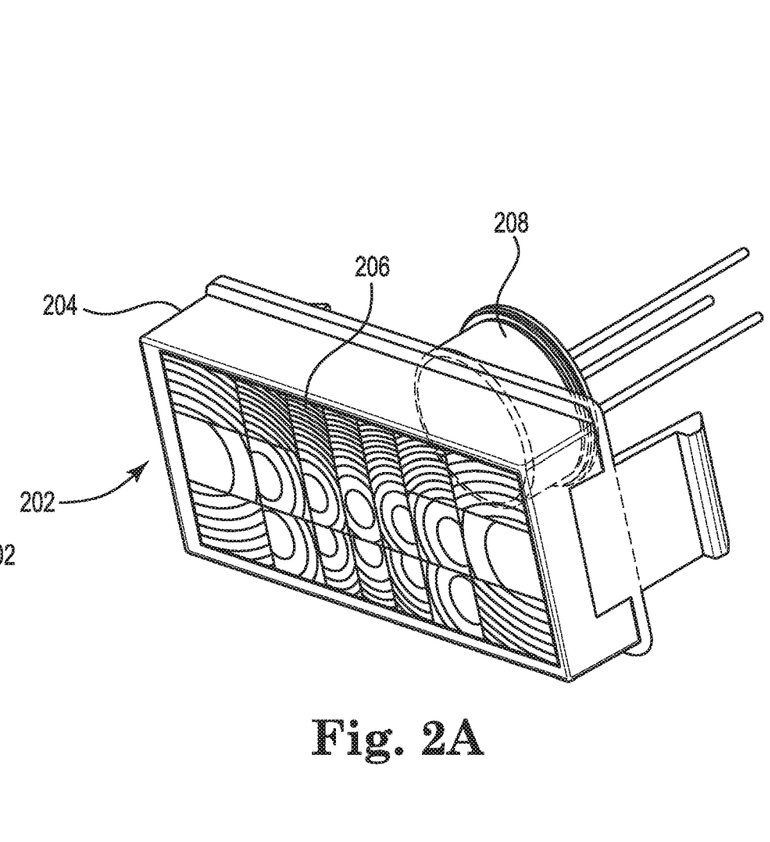
FIG. 2A illustrates another system having a Fresnel lens array constructed in accordance with one or more embodiments of the present disclosure.

FIG. 2A illustrates another system having a Fresnel lens array constructed in accordance with one or more embodiments of the present disclosure. In the embodiment of FIG. 2A, the Fresnel lens array 202 is part of a pyroelectric detection system which includes a pyroelectric sensor 208.

The Fresnel lens array 206 is also mounted in a housing 204 and can, for example, be positioned within the system 100 of FIG. 1 at location 102. As can be seen from FIG. 2A, the array is generally flat which can be beneficial for implementations such as shown in FIG. 1.

The form factor is also compact and can be a non-round shape, such as rectangular, allowing its use in many applications. It also has a wider field of view than previous Fresnel lenses or lens arrays due to its' unique use of complimentary lens elements in the outer off-axis regions (to be discussed later), allowing it to be utilized in many new fields of use.

Figure 2B:
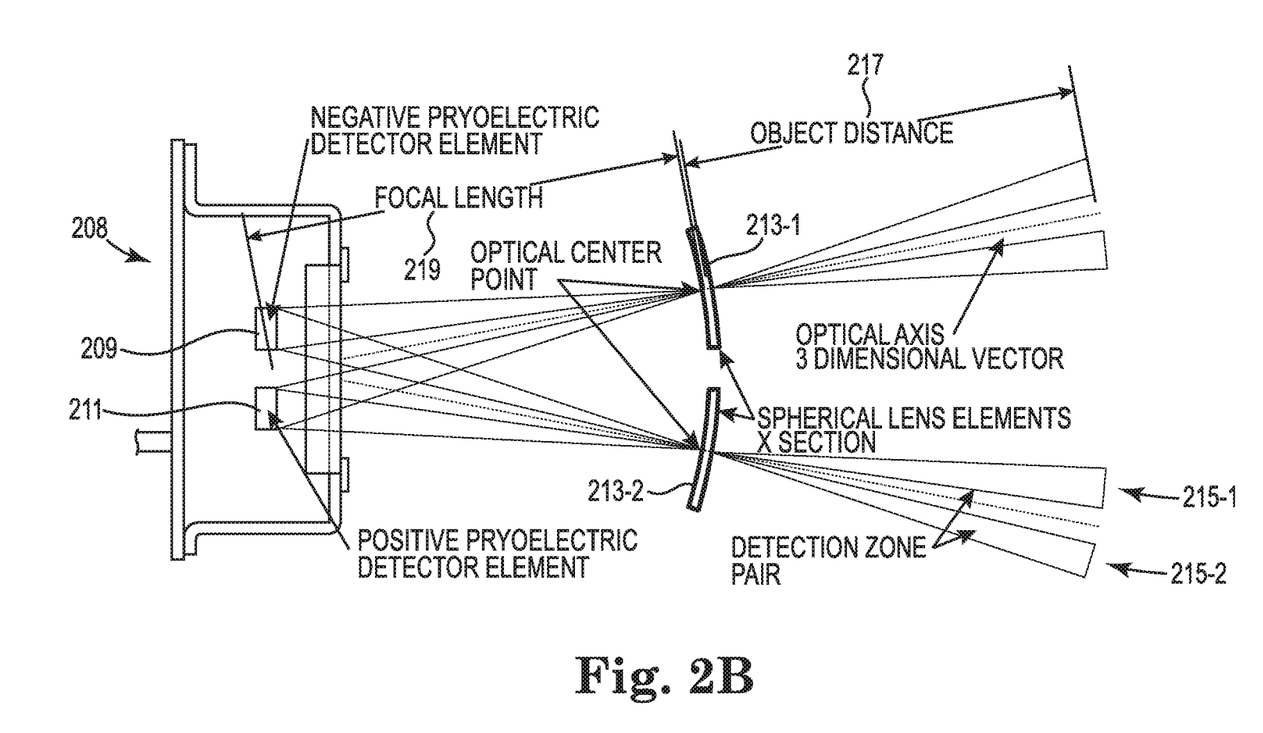
FIG. 2B illustrates a top cross-sectional view of an infrared motion detection system containing a pyroelectric sensor which contains two detector elements and two Fresnel lens elements in accordance with one or more embodiments of the present disclosure.

FIG. 2B illustrates a top cross-sectional view of an infrared motion detection system containing a pyroelectric sensor which contains two detector elements and two Fresnel lens elements in accordance with one or more embodiments of the present disclosure.

FIG. 2B shows a pyroelectric sensor 208 which contains two detector elements 209 and 211 and two Fresnel lens elements 213-1 and 213-2. Such elements can, for example, be formed by an injection molding technique using high density polyethylene.

The lenses are set at a distance, from the detector elements, that is equal to the focal length of each lens 219. Such an arrangement focuses the image of objects in the field of view onto the plane of detector elements.

The detectors in the pyroelectric sensor 208 are configured electrically such that an increase in energy reaching, for example, element 209 will generate a negative electrical signal, while an increase in energy reaching detector 211 will generate a positive electrical signal. This use of a positive and a negative generating element, for example, allows the signals to cancel out should the room temperature increase or decrease or an object viewed in a zone pair (e.g., 215-1 and 215-2) change temperature.

The energy of all objects in detection zone 215-2 that reach lens element 213-2 will be focused onto detector element 209 while the energy of all objects in zone 215-1 that reaches lens element 213-2 will be focused onto detector element 211. For simplicity only the rays of the object at the edges of the detection zones is shown and only the rays that pass through the optical center point of each lens element are illustrated.

The noted rays strike the edges of the detector elements. When a target (e.g., human walking through the room) traverses an area within the field of view, for example, starting at the bottom of FIG. 2 and traversing toward the top of the figure, at some distance from the lens elements (object distance 217), the target enters into detection zone 215-2.

When this occurs, the energy from the target's body inside the detection zone that lands on lens element 213-2 will land on detector 209, generating a negative signal. As the target traverses out of the detection zone, the signal returns to zero.

As the target continues, the target enters detection zone 215-1 and the energy from the target's body inside the detection zone that lands on lens element 213-2 will land on detector 211, generating a positive signal. As the target traverses out of the detection zone, the signal returns to zero.

The resulting electrical signal generated by the target passing though this detection zone pair is a full sine wave. The same will occur as a target traverses through each detection zone pair created by each lens element in a motion detection system.

For aid to the reader, each lens has an optical axis illustrated in FIG. 2B. In such an embodiment, the optical axis is a vertical line that is normal to the lens element and it runs through the optical center of the lens element.

Figure 3A:
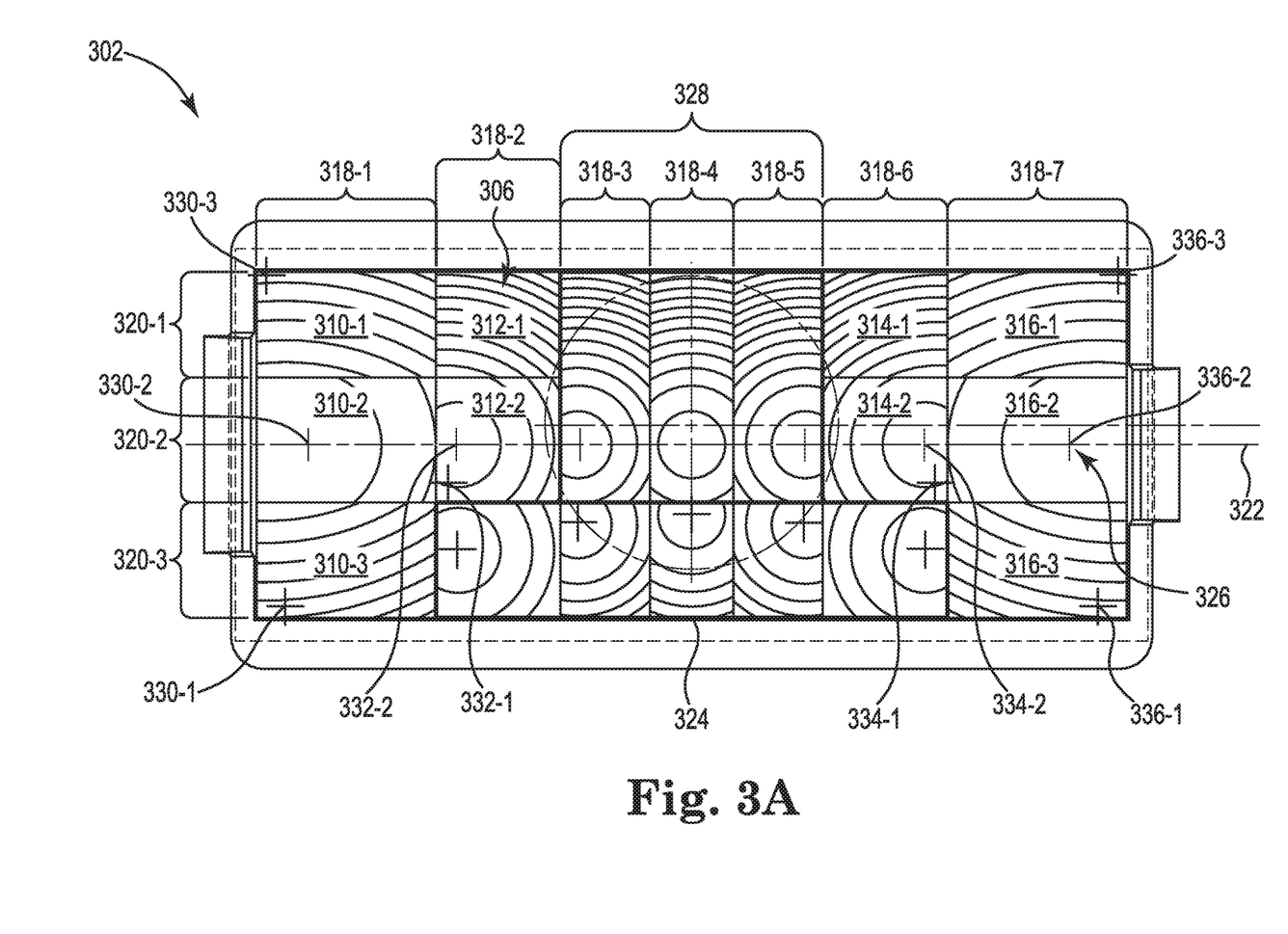
FIG. 3A illustrates a layout of Fresnel lens portions to form a Fresnel lens array in accordance with one or more embodiments of the present disclosure.

FIG. 3A illustrates a layout of Fresnel lens elements to form a Fresnel lens array in accordance with one or more embodiments of the present disclosure. FIG. 3A illustrates a Fresnel lens array 302, comprising multiple columns (318-1 through 318-7) of lens elements (310-1, 310-2, 310-3, 312-1, 312-2, 314-1, 314-2, 316-1, 316-2, 316-3, and the elements within 324 and 328). Each column of the arrays' lens elements is formed from multiple defined areas of one or more Fresnel lenses.

These defined areas are small portions of a larger Fresnel lens structure and are selected due to their unique focal length, optical axis and/or field of view characteristics, such that they can improve the overall field of view of the Fresnel lens array. This will be discussed in more detail with respect to FIG. 3B.

Figure 5A:
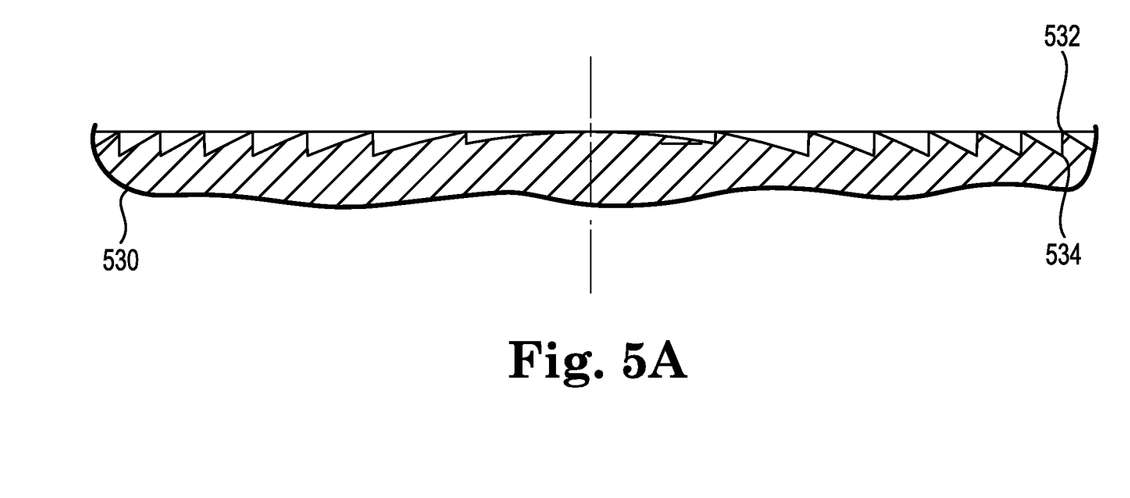
FIGS. 5A, 5B, and 5C illustrate various Fresnel lens types that can be formed and wherein portions thereof can be extracted to form a Fresnel lens array in accordance with one or more embodiments of the present disclosure.
Figure 5B:
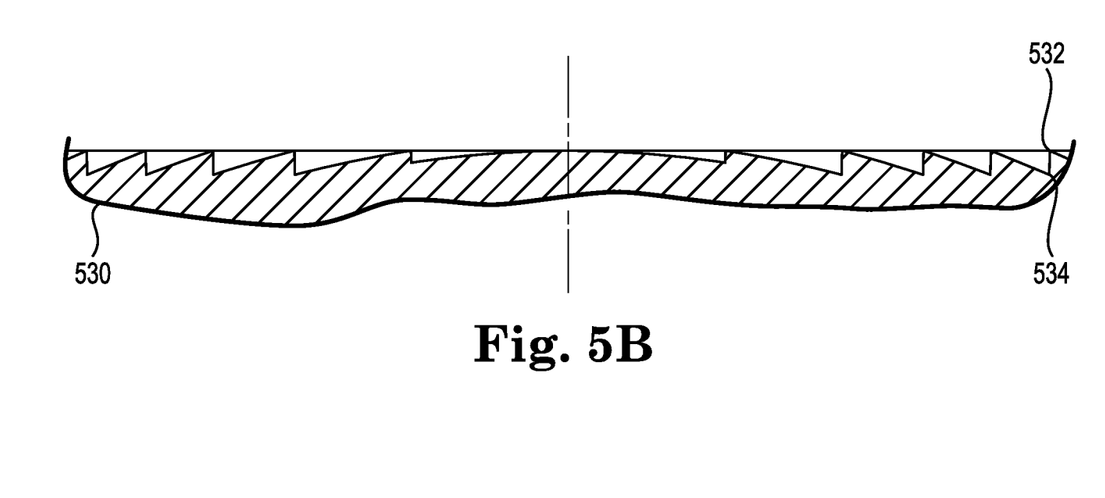
Figure 5C:
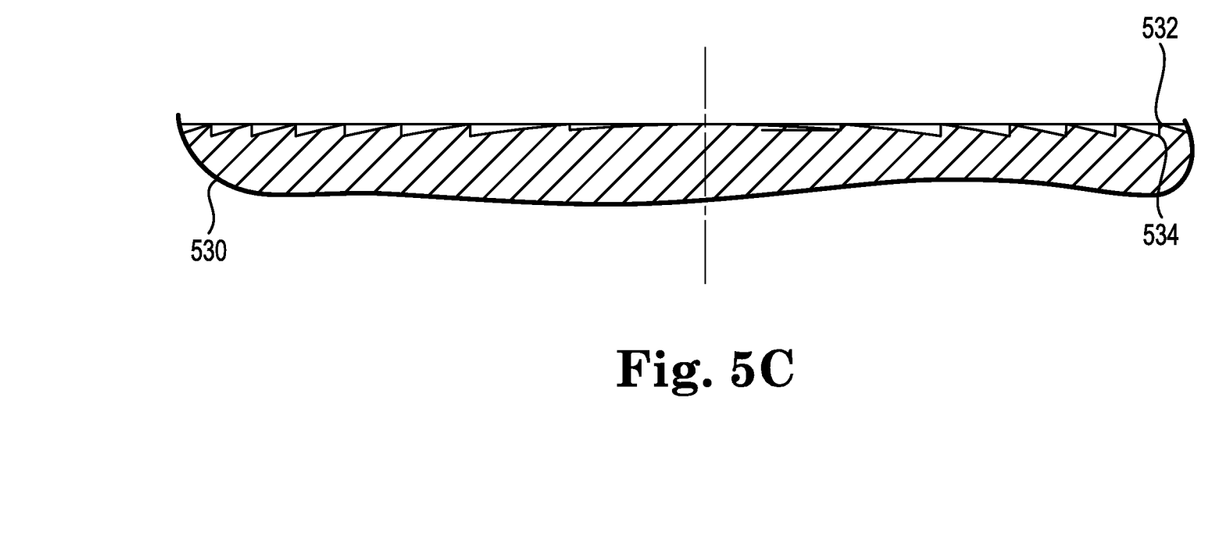

The lens array optical elements may not be parts of or removed from actual Fresnel lenses, but may be formed from a lens surface structure (as shown in FIGS. 5A-5C) and limited to a specific boundary relative to the elements optical center (specific defined area) of a particular type or focal length of Fresnel lens. As discussed herein, the array is made up of multiple parts that are representative of different portions of one or more Fresnel lenses.

The parts may be from different types or focal lengths of Fresnel lenses. For example, the array may have parts from two or more of an 8 mm, 10 mm, 16 m, and/or 48 mm focal length lenses. Through use of parts from these different focal length lenses, the array can be individualized to improve its characteristics over traditional Fresnel lenses.

The embodiment of FIG. 3A also shows a lens array having a center portion 328 including one or more defined areas of one or more Fresnel lenses. As shown in the embodiment of FIG. 3A, the center portion can include three elongate elements of one or more Fresnel lenses. In some embodiments, the center portion may have more or less elements.

Some embodiments can utilize a center portion having one or more top sections and one or more middle sections. However, as illustrated in FIG. 3A, the center portion may have one or more vertical defined areas that span the top and middle sections 320-1 and 320-2 of the center portion 328.

The center portion 328 can also include three columns 318-1, 318-2, and 318-3 with each column having a top section and a middle section. And, as illustrated in FIG. 3A, each column of the center section can be just a single defined area provided therein.

FIG. 3A also includes a left portion which includes an outer column 318-1 having top, bottom, and middle sections 310-1, 310-2, and 310-3 (across general sections 320-1, 320-2, and 320-3), and an inner column 318-2 having a top and middle section 312-1 and 312-2 (across general sections 320-1 and 320-2). The right portion also includes an outer column 318-7 having top, bottom, and middle sections 316-1, 316-2, and 316-3 (across general sections 320-1, 320-2, and 320-3) and an inner column 318-6 having a top and middle section 314-1 and 314-2 (across general sections 320-1 and 320-2).

Figure 4A:
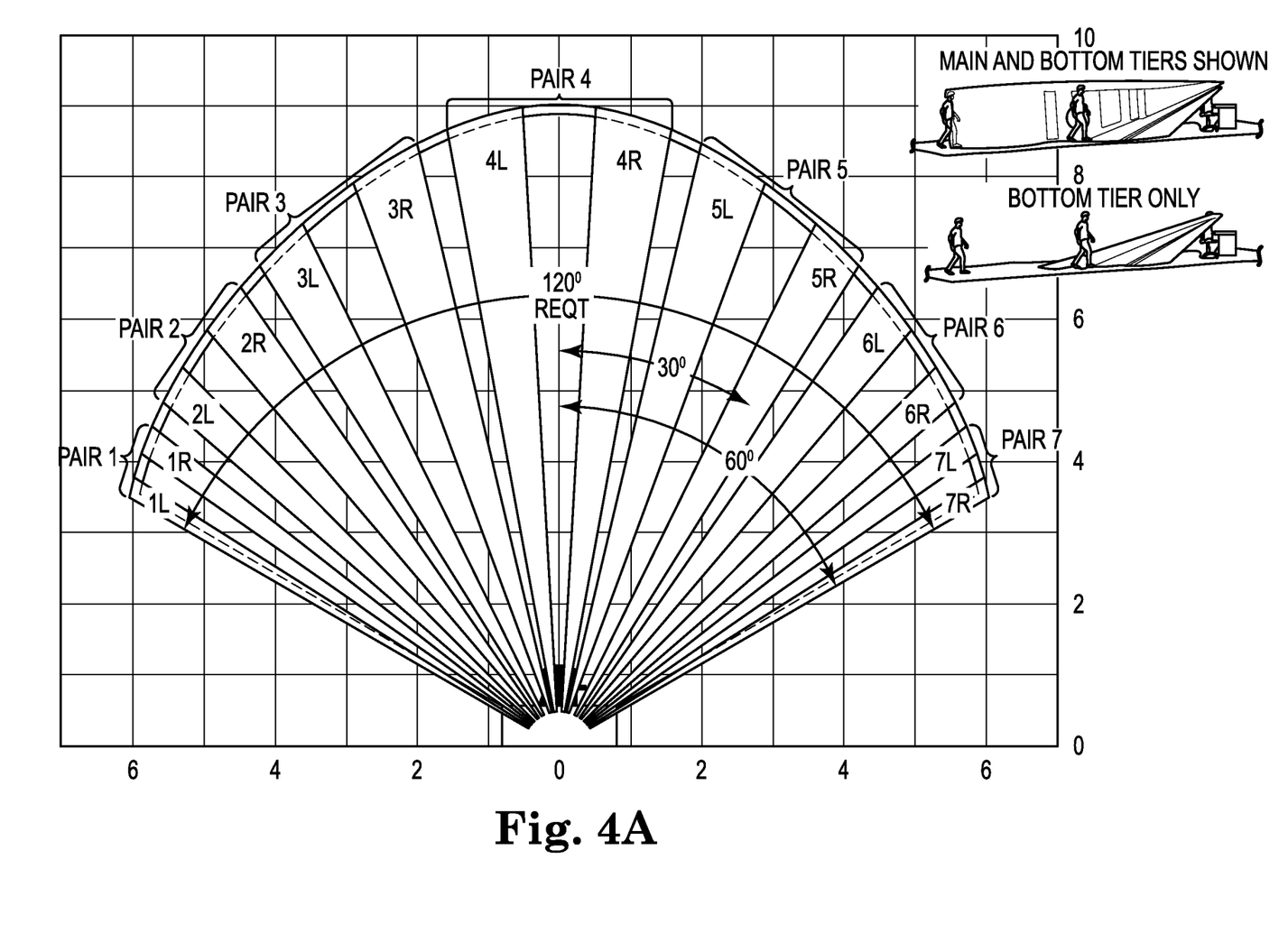
FIG. 4A illustrates an example of how a Fresnel lens array constructed in accordance with one or more embodiments of the present disclosure can generate a series of detection zones defining the systems field of view.

The lower portion 324 has one or more defined areas of the one or more Fresnel lenses. For example, in some embodiments the defined areas are aligned in columns 318-2, 318-3, 318-4, 318-5 and 318-6 (e.g., five columns). As shown in FIG. 4A, the lower portion 324 (i.e., described as the bottom tier in FIG. 4A) can be used for sensing distances that are close to the pyro sensor and lower areas of the overall field of view. When such lens elements are incorporated into a sensing array as described herein, the overall field of view can include close and low detection zones from the bottom lens elements and high and longer range detection zones from the other array lens elements, as well as wider field of view.

As shown in FIG. 3A, embodiments also have a left portion including one or more defined areas (i.e., in this embodiment, lens elements 310-1, 310-2, 310-3, 312-1, and 312-2) and a right portion including one or more defined areas (i.e., in this embodiment, lens elements 314-1, 314-2, 316-1, 316-2, and 316-3) of the one or more Fresnel lenses. These outer elements would be off-axis elements in traditional designs, while the inner elements would be on-axis elements.

In prior Fresnel designs, the outer portions of the lenses were weak and inefficient and as a result, the size of the outer elements would be increased in an attempt to grab more energy. However, beyond a certain size, no added energy from a target object at distance reaching an outer lens element could land on the pyro sensors' detection elements (e.g., sensor 208) and consequently, the sensor could not be improved beyond a certain limit.

The outer portions of the embodiments of the present disclosure use multiple lens elements that result in increased energy landing on the sensor. In some such implementations, two or more times the amount of energy from elements 310-1, 310-2, and 310-3, as compared to a design where a single element is placed in the area occupied by 310-1, 310-2, and 310-3.

An inefficiency exists in a single tall outer lens element as the energy from a human at distance reaching the upper portion of this single tall lens element will be directed above the pyros' detection elements and the energy reaching the lower portion of this element will be directed below the pyros' detection elements. An increase in the energy reaching the pyro detectors from off-axis lens elements is possible without increasing the size of the lens array, because the unique elements are selected with optical centers positioned such that each element in a single outer column focuses energy on the pyros detectors from the same area in the field of view minimizing energy going above or below the pyros detection elements. For example, the optical center (cross shape) of element 310-3 falls in the upper left corner of element 310-1, and the optical center of element 310-1 falls in the lower left corner of 310-3. A similar arrangement occurs with respect to elements 316-1 and 316-3, with the optical center of element 316-3 falling in the upper right corner of element 316-1, and the optical center of element 316-1 falling in the lower right corner of 316-3.

As shown in FIG. 3A, in some embodiments, these array sections include one or more optical centers that are located at a position in a first defined area that is opposite a vertical neighboring defined area's optical center (e.g., neighboring areas are for example those within column 318-1). However, as shown in FIG. 3A, the first defined area (e.g., 310-1) is not adjacent to the neighboring defined area (310-3).

Further, each of the left and right portions of the embodiment of FIG. 3A also can be defined as having a top section 320-1, a middle section 320-2, and a bottom section 320-3. Each section within a column of the array includes one defined area of the one or more Fresnel lenses.

One benefit of selecting particular defined areas of Fresnel lens structures is the ability to potentially maximize the energy from a human at distance directed to a sensor by the lens array. For example, rather than using a whole Fresnel 48 mm focal length lens or one large section of the lens structure, in the embodiment shown in FIG. 3A, particular defined areas of the Fresnel lens structure are positioned in sections 310-1, 310-2, and 310-3 and also at 316-1, 316-2, and 316-3. This is also the case for 312-1 and 312-2 as well as 314-1 and 314-2.

Another implementation that is beneficial in the embodiment shown in FIG. 3A is that the defined area in each of the middle sections 320-2 has an optical center (the cross shapes in each section) that is aligned along an axis of elongation 322 of the array 306. Such an arrangement allows for better imaging continuity between the different middle sections in each column and the array sections as a whole.

The locations of the optical centers of the various elements of the lens array are used to improve the energy projected onto the sensor behind the array and, as such, the locations shown in FIG. 3A will be discussed in more detail below. In the embodiment of FIG. 3A, the outer column 318-1 includes three vertically stacked optical elements and shows a structure where an optical center 330-1 of element 310-1 is located at a position below the optical center 330-2 of element 310-2.

In this manner, the optical element 330-2 is located between optical center 330-1 and element 310-1. In FIG. 3A, the optical center 330-1 is located on element 310-3, however, in some implementations, it may be beyond the edge of the array (outside the outer perimeter edge of the array, for example, below the bottom edge of element 310-3).

Likewise, the optical center 330-3 of element 310-3 is located at a position above the optical center 330-2 of element 310-2. In this manner, the optical element 330-2 is located between optical center 330-3 and element 310-3. Also shown in FIG. 3A, the optical center 330-3 is located on element 310-1; however, as noted with respect to optical center 330-1, in some implementations, it may be beyond the edge of the array.

The same structure is shown on the opposite end of the array in column 318-7, in which the optical center 336-1 of element 316-1 is located at a position below the optical center 336-2 of element 316-2. As such, the optical element 336-2 is located between optical center 336-1 and element 316-1. Optical center 330-1 may be beyond the edge of the array.

The optical center 336-3 of element 316-3 is located at a position above the optical center 336-2 of element 316-2. In this manner, the optical element 336-2 is located between optical center 336-3 and element 316-3. Further, although optical center 336-3 is located on element 316-1; however, in some implementations, it may be beyond the edge of the array.

The inner columns 318-2 and 318-6 also have a structure where the optical center of one element is not located on that element. For example, in the embodiment shown in FIG. 3A, column 318-2 includes three vertically stacked elements and the optical center 332-1 of optical element 312-1 is located below the optical center 332-2 of optical element 312-2, thereby positioning optical center 332-2 between optical center 332-1 and element 312-1.

Similarly, column 318-6 includes three vertically stacked elements and the optical center 334-1 of optical element 314-1 is located below the optical center 334-2 of optical element 314-2, thereby positioning optical center 334-2 between optical center 334-1 and element 314-1. As shown in FIG. 3A, the optical center 332-1 can be on optical element 312-2 or the element below. Similarly, the optical center 334-1 can be on optical element 314-2 or the element below.

In some implementations, optical centers 332-1 and 334-1 may be beyond the edge of the array (e.g., optical center 334-1 can be positioned below the bottom edge of the bottom element of column 318-6). Using these structures, the embodiments of the present disclosure can be used to improve the energy projected onto the sensor behind the array Embodiments of the present disclosure allow for wider field of view and/or a more suitable form factor for some implementations. This can be accomplished, for example, by optimizing the focal length on each element of a Fresnel lens array to, for instance, generate balanced energy on each pyroelectric (pyro) detector for a target object in the field of view (a human) at distance while limiting the size of the off-axis lens elements contained in the middle row (320-2) of the outer regions to a size that improves and potentially maximizes lens area energy efficiency (e.g., maximize the proportion of the energy of the human at distance that reaches the lens element that then lands on pyro elements, minimizing the energy reaching the lens element that goes above, below, left, or right of the pyros' detection elements); then, implementing complimentary lens elements above and/or below this lens element to direct and maximize energy from this same target at distance onto the pyros detection elements again minimizing energy going above or below the pyros detection elements.

Figure 3B:
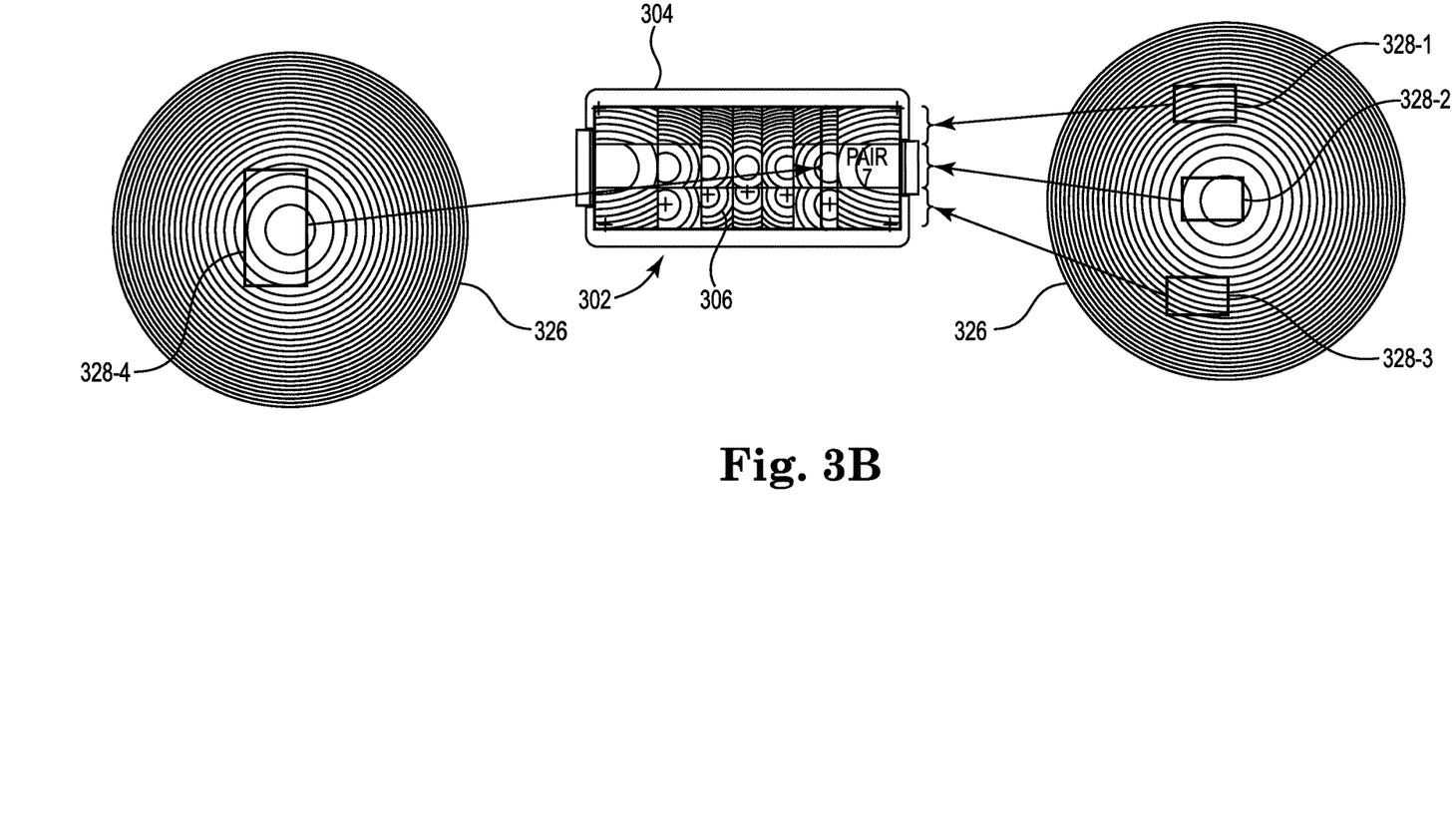
FIG. 3B illustrates an example of how different lens portions are selected and placed to form a Fresnel lens array in accordance with one or more embodiments of the present disclosure.

FIG. 3B illustrates an example of how different lens portions are selected and placed to form a system of complimentary lens elements in the array in accordance with one or more embodiments of the present disclosure. In this embodiment, the device 302 includes a housing 304 with an array 306. In the illustration of FIG. 3B, the comparison is made between a single element 328-4 selected from a Fresnel lens structure 326 which results in low energy reaching the pyro and multiple elements 328-1, 328-2, and 328-3 from a Fresnel lens structure 326 placed in a particular location in the lens array 306 which results in high energy reaching the pyro.

Here, the outer right edge (as these lens elements form the pyro detection zones labeled Pair 7 in FIG. 4A) on the array 306 of device 302 (having housing 304) is discussed as an example of the benefits of selecting portions in a particular part of the array. Such arguments can also be made for using an array embodiment of the present disclosure as compared to a single Fresnel lens element.

The size of the off axis elements beyond which a severe decline begins to occur between percent energy increase on the pyro detector versus the percent area added to the lens element can be determined through experimentation. For example, in some embodiments, the outside side lens element sizes of the embodiments of the present disclosure are limited at the point where the energy increase drops below 70% of the element area increase.

In this example, the left and right Fresnel lenses 326 are of the same focal length (e.g., 48 mm). Using the same focal length, an embodiment of the present disclosure can create a lens portion from a defined area of a master template used for constructing Fresnel lenses.

In embodiments of the present disclosure, the lens array has at least one column of two or more vertically stacked lens elements wherein the element at the top will have its optical center below the optical center of the neighboring element below it. And, if more than two elements exist in this vertical column, the lens array may have a bottom lens element whose optical center is vertically above the optical center of the element directly above it. When these vertically stacked elements, which display a reverse vertical progression of optical centers (e.g., 310-1 and 310-3 described above with respect to FIG. 3A), are positioned properly; the detection zone pairs resulting from these elements will be superimposed creating a single high sensitivity detection zone pair (air 7 detection zones is shown in FIG. 4A, FIG. 3B is showing which detection zone pair the three elements are contributing to).

In some embodiments, in, for example, a flat lens array with a horizontal field of view greater than 80°, this superimposing of detection zones can double or triple the energy on the pyro detector for motion in these detection zones as compared to the traditional devices. The embodiments of the present disclosure allow a flat lens array to achieve a wider field of view than traditional flat lens arrays.

The fabrication of the Fresnel lens array follows the same processes used to fabricate the Fresnel lenses used in motion detectors and occupancy detection PIR systems. For example, the process can include diamond turning the focal length masters from a brass plate, creating multiple copies via placing the masters in Nickel electroforming baths to grow negative copies, machining the electroform copies to the element sizes noted on an array schematic, assembling the machined elements into an array, placing this assembly in an electroforming bath to grow a Nickel copy of the array, machining this copy to fit into an injection molding tool cut to form the remainder of the lens geometry, then use high density polyethylene (HDPE) to injection mold the lenses. The resulting molded lens can then be placed in front of a pyroelectric sensor as shown in FIG. 2, for use, for example, in a thermostat occupancy detection system.

As can be seen from the example of FIG. 3B, each of the multiple defined areas can be formed from a different area of the one or more Fresnel lenses. As discussed herein, these areas can be selected based on their focal length, field of view, and optical center location to provide the various benefits to the overall array as discussed herein.

For instance, the lenses of the one or more Fresnel lenses include lenses selected from focal lengths of: 8 mm, 10 mm, 16 mm, and 48 mm. In some such embodiments, the multiple columns of lens elements in the array are formed from defined areas from Fresnel lenses having focal lengths of: 8 mm, 10 mm, 16 mm, and 48 mm.

Further, in some embodiments, the focal lengths used in each of the sections of a particular column can be the same. Additionally, the focal lengths of the lens elements in the array can become greater from a central column to an outermost column on both a left side and a right side of the array. For example, in some embodiments, column 318-4 can have a focal length of 8 mm, 318-3 and 318-5 have a focal length of 10 mm, 318-2 and 318-6 have a focal length of 16 mm, and 318-1 and 318-7 have a focal length of 48 mm. One benefit of such an arrangement combined with complimentary lens elements in the outer regions is that it can optimize the energy that reaches the sensor.

Use of higher focal lengths at the outer elements of the array, the amount of energy can be increased. For example, the use of 48 mm focal length rather than 10 mm can result in a 650% improvement in energy reaching the sensor.

In one embodiment, a center portion 318-4 includes one or more defined areas of a Fresnel lens having a first focal length. The embodiment also includes a first inner portion (e.g., 318-3 or 318-5) including one or more defined areas of a Fresnel lens having a second focal length, a second inner portion (318-2 or 318-6) including one or more defined areas of a Fresnel lens having a third focal length, and an outer portion (318-1 or 318-7) including one or more defined areas of a Fresnel lens having a fourth focal length.

The focal lengths of the first through fourth focal lengths in such embodiments can be different focal lengths including those listed above, among other suitable focal length distances. They can be arranged in any suitable order, however, in some embodiments, the second focal length is the same or greater than the first focal length. The third focal length can also be greater than the second focal length. And, in some embodiments, the fourth focal length can be greater than the third focal length.

Further, in some particular embodiments, the second focal length is greater than the first focal length, the third focal length is greater than the second focal length, and the fourth focal length is greater than the third focal length. In this manner, the center portion is the smallest focal length and the outermost portion is the largest focal length and the focal lengths increase from the center to the outermost portion.

Figure 4B:
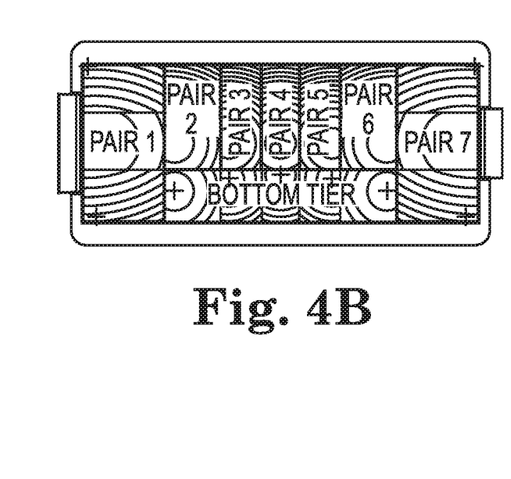
FIG. 4B illustrates how the portions of the Fresnel array contribute to the implementation described in FIG. 4A.

This can also be the arrangement on the left and right sides of the Fresnel lens array. In this way, the field of view of the array can be symmetrical as well as the zones of energy detection produced by the two sides of the array as can be seen in FIGS. 4A and 4B.

As discussed above, in some embodiments, a second inner portion includes one or more defined areas of a Fresnel lens having a third focal length and, wherein the second inner portion contains two or more vertically stacked elements. The first stacked element can be adjacent to one side of a second vertical stacked element while the optical center of the second stacked element is located between the first stacked element and its optical center. In this manner, more energy can be provided to the surface of the sensor array. As discussed above with respect to FIG. 3A, the optical center of the first stacked element can be located on the second stacked element, can be located on a third stacked element, or can be located outside the outer perimeter edge.

FIG. 4A illustrates an example of how a Fresnel lens array constructed in accordance with one or more embodiments of the present disclosure will produce zones of energy detection in the field of view. FIG. 4B illustrates how the portions of the Fresnel array contribute to the implementation described in FIG. 4A. FIG. 4B shows the groupings of the array elements which contribute to each detection zone pairing that can be used to direct energy along the width of the field of view as shown in FIG. 4A.

As illustrated, in some embodiments, the array can be 120 degrees, which is considerably wider than traditional Fresnel lenses, which can be 80-90 degrees with low energy collected in the outer detection zones in some implementations. Additionally, as discussed above, the amount of energy provided to the sensor can be greatly increased in the outer or off-axis detection zones as compared to traditional devices.

For the detection zones shown in FIG. 4A, the center detection zone pair provides high optical efficiency (Pair 4) and is considered on axis as the lens element generating these detection zones is directly in front of the sensor (as shown in FIG. 2). And, although the outermost detection zones are formed from lens elements that are the largest focal length, the lens elements are far off axis and, as such, provide lower optical efficiency (Pairs 1 and 7), even though that efficiency is considerably greater than the outer portions of traditional designs due to the use of complimentary lens elements.

FIG. 4A also includes two schematics showing the effectiveness of the bottom tier of the array with respect to close distance areas in front of the detector and areas that are at low angles compared to the detector's location. Additionally, the second schematic shows the complimentary nature of the bottom tier and the rest of the array in sensing the area in front of the detector.

In order to construct such embodiments, Fresnel lens structures of differing focal lengths need to be utilized. Three examples are provided below.

FIGS. 5A, 5B, and 5C illustrate various Fresnel lens types that can be formed and wherein portions thereof can be extracted to form a Fresnel lens array in accordance with one or more embodiments of the present disclosure. As can be discerned from review of the images of the three examples, the lenses 530 have a number of optical surfaces thereon and these surfaces have differing distances between a peak 532 and a trough 534, differing angles of the angled surfaces, and differing widths of the angled surfaces.

It is these factors that define the focal length of the lens. Based on these factors, FIG. 5A represents a 10 mm focal length lens structure, FIG. 5B represents a 16 mm focal length lens structure, and FIG. 5C represents a 48 mm focal length lens structure. It should be noted that the illustration of FIGS. 5A and 5B are scaled at 20:1, while FIG. 5C is scaled at 10:1, to allow more of the surface of this lens shape to be shown. It is such structures that can be used to fabricate the lens portions selected for the Fresnel lens array embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A lens, comprising:
   three or more columns, wherein a first one of the three or more columns comprising three or more vertically stacked lens sections and where each of the remaining three or more columns having two or more vertically stacked lens sections, wherein each of the vertically stacked lens sections is defined by a sub-region of a corresponding Fresnel lens structure;
   wherein the sub-region of the Fresnel lens structure of a first one of the three or more vertically stacked lens sections of the first one of the three or more columns has a first optical center and the sub-region of the Fresnel lens structure of a second one of the three two or more vertically stacked sections of the first one of the three or more columns has a second optical center and the sub-region of the Fresnel lens structure of a third one of the three or more vertically stacked sections of the first one of the three or more columns has a third optical center, wherein the first optical center vertically intersects with the second one of the three two or more vertically stacked sections, the second optical center is not coincident with the first optical center, and the third optical center vertically intersects with one of the first one of the three or more vertically stacked sections or the second one of the three or more vertically stacked sections; and
   wherein the three or more columns include an intermediate column, a left column positioned adjacent a left side of the intermediate column and a right column positioned adjacent a right side of the intermediate column, wherein a focal length of each of the sub-regions of the Fresnel lens structures in the intermediate column is less than a focal length of each of the sub-regions of the Fresnel lens structures in the left column and the right column.

2. The lens of claim 1, wherein each of the three or more of the vertically stacked lens sections of the first one of the three or more columns include a different sub-region of a common Fresnel lens structure.

3. The lens of claim 2, wherein the common Fresnel lens structure has a focal length that is in the range of 8 mm to 48 mm.

4. The lens of claim 1, wherein the first one of the three or more column corresponds to the left column, the second one of the three or more columns corresponds to the intermediate column, and the third one of the three or more columns corresponds to the right column.

5. The lens of claim 4, wherein the third one of the three or more columns comprises three or more vertically stacked lens sections, wherein the sub-region of the Fresnel lens structure of a first one of the three or more vertically stacked lens sections of the third one of the three or more columns has a first optical center and the sub-region of the Fresnel lens structure of a second one of the three or more vertically stacked sections of the third one of the three or more columns has a second optical center, wherein the first optical center vertically intersects with the second one of the two or more vertically stacked sections, the second optical center is not coincident with the first optical center.

6. A Fresnel lens structure, comprising:
   an intermediate column including two or more vertically stacked lens sections, wherein at least one of the vertically stacked lens sections of the intermediate column has an optical center that vertically intersects with a different one of the vertically stacked lens sections of the intermediate column, and wherein each of the two or more vertically stacked lens sections of the intermediate column is defined by a sub-region of a corresponding Fresnel lens structure;
   a left column including a first vertically stacked lens section and a second vertically stacked lens section, wherein the first vertically stacked lens section has an optical center that vertically intersects with the second vertically stacked lens section of the left column and is non-coincident with an optical center of the second vertically stacked lens section of the left column, and wherein each of the two or more vertically stacked lens sections of the left column is defined by a sub-region of a corresponding Fresnel lens structure;
   a right column including a first vertically stacked lens section and a second vertically stacked lens section, wherein the first vertically stacked lens section has an optical center that vertically intersects with the second vertically stacked lens section of the right column and is non-coincident with an optical center of the second vertically stacked lens section of the right column, and wherein each of the two or more vertically stacked lens sections of the right column is defined by a sub-region of a corresponding Fresnel lens structure; and
   wherein a focal length of each of the sub-regions of the Fresnel lens structures in the intermediate column is less than a focal length of each of the sub-regions of the Fresnel lens structures in the left column and the right column.

7. The Fresnel lens structure of claim 6, wherein each of the left and right columns includes a top vertically stacked lens section, a bottom vertically stacked lens section, and a middle vertically stacked lens section, and wherein the first vertically stacked lens section comprises one of the top vertically stacked lens section, the bottom vertically stacked lens section, and the middle vertically stacked lens section, and the second vertically stacked lens section comprises one of the other of the top vertically stacked lens section, the bottom vertically stacked lens section, and the middle vertically stacked lens section.

8. The Fresnel lens structure of claim 6, wherein the second vertically stacked lens section of the right column has an optical center that vertically intersects with the first vertically stacked lens section of the right column.

9. The Fresnel lens structure of claim 7, wherein the second vertically stacked lens section of the left column has an optical center that vertically intersects with the first vertically stacked lens section of the left column.

10. The Fresnel lens structure of claim 6, wherein the first vertically stacked lens sections of the left and the right columns and the second vertically stacked lens sections of the left and the right columns are each separated by at least a third vertically stacked lens section.

11. The Fresnel lens structure of claim 6, wherein each of the right and left columns includes three of more vertically stacked lens section.

12. The Fresnel lens structure of claim 6, wherein the intermediate column comprises three sub-columns with each sub-column having two or more vertically stacked lens sections.

13. The Fresnel lens structure of claim 6, further comprising a right outermost column laterally adjacent the right column and a left outermost column laterally adjacent to the left column, wherein the right outermost column comprises two or more vertically stacked lens sections and the left outermost column comprises two or more vertically stacked lens sections.

14. A Fresnel lens structure, comprising:
   a first column including two or more vertically stacked lens sections each defined by a sub-region of a Fresnel lens structure with non-coincident optical centers, wherein each of the two or more vertically stacked lens sections of the first column having a corresponding focal length;
   a second column adjacent the first column, wherein the second column includes two or more vertically stacked lens sections each defined by a sub-region of a Fresnel lens structure, wherein each of the two or more vertically stacked lens sections of the second column having a corresponding focal length; and
   a third column adjacent the second column, wherein the third column includes two or more vertically stacked lens sections each defined by a sub-region of a Fresnel lens structure wherein each of the two or more vertically stacked lens sections of the third column having a corresponding focal length;
   wherein the second column is interposed between the first column and the third column, and
      wherein the focal lengths of each of the two or more vertically stacked lens sections of the first column are larger than the focal lengths of each of the two or more vertically stacked lens sections of the second column; and
      wherein the focal lengths of each of the two or more vertically stacked lens sections of the third column are larger than the focal lengths of each of the two or more vertically stacked lens sections of the second column.

15. The Fresnel lens structure of claim 14, wherein an optical center of a first vertically stacked lens section of the second column intersects with a second vertically stacked lens section of the second column.

16. The Fresnel lens structure of claim 14, wherein the first column includes three or more vertically stacked lens sections each defined by a sub-region of a Fresnel lens structure with non-coincident optical centers, and wherein an optical center of a first vertically stacked lens section of the first column vertically intersects with a third vertically stacked lens section of the first column.

17. The Fresnel lens structure of claim 14, wherein the Fresnel lens structure of a first vertically stacked lens section of the second column has an outer perimeter edge, and wherein an optical center of the first vertically stacked lens section of the second column intersects the Fresnel lens structure outside of the outer perimeter edge of the first vertically stacked lens section of the second column.

18. The Fresnel lens structure of claim 14, wherein the second column comprises three sub-columns with each sub-column having two or more vertically stacked lens sections.

* * * * *